US007797704B2

(12) United States Patent
Anderson

(10) Patent No.: US 7,797,704 B2
(45) Date of Patent: Sep. 14, 2010

(54) SYSTEM AND METHOD FOR PERFORMING WORK BY ONE OF PLURAL THREADS USING A LOCKABLE RESOURCE

(75) Inventor: Eric A. Anderson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1464 days.

(21) Appl. No.: 11/094,554

(22) Filed: Mar. 30, 2005

(65) Prior Publication Data
US 2006/0225078 A1 Oct. 5, 2006

(51) Int. Cl.
G06F 9/46 (2006.01)
G06F 12/00 (2006.01)
G06F 7/00 (2006.01)

(52) U.S. Cl. .................. 718/102; 718/104; 710/200; 707/8

(58) Field of Classification Search .............. 718/102, 718/104; 710/200; 707/8
See application file for complete search history.

(56) References Cited

U.S. PATENT DOCUMENTS

| 5,504,670 | A | 4/1996 | Barth et al. | |
|---|---|---|---|---|
| 5,761,659 | A | 6/1998 | Bertoni | |
| 5,991,808 | A | 11/1999 | Broder et al. | |
| 6,321,308 | B1 * | 11/2001 | Arnon et al. | 711/147 |
| 6,449,614 | B1 * | 9/2002 | Marcotte | 707/8 |
| 6,823,351 | B1 * | 11/2004 | Flood et al. | 707/206 |
| 6,973,521 | B1 | 12/2005 | Indiresan et al. | |
| 2004/0083481 | A1 * | 4/2004 | Shultz et al. | 719/312 |
| 2004/0088573 | A1 | 5/2004 | Jeyaram | |
| 2006/0101472 | A1 * | 5/2006 | Davis | 719/313 |
| 2006/0225077 | A1 | 10/2006 | Anderson | |

OTHER PUBLICATIONS

Posix Threads Programming, 2001, http://web.archive.org/web/20010813050044/http://www.lln l.gov/computing/tutorials/workshops/workshop/pthreads/MAIN.html.*
DCE Glossary of Technical Terms , 1999, (http://web.archive.org/web/20010813050044/http://web.archive.org/web/19991009223122/www.opengroup.org/dce/info/papers/dce-glossary.htm).*
Blumofe, R., et al., "Scheduling Multithreaded Computations by Work Stealing", IEEE FOCS '94, Nov. 20-22, 1994, 13 pages.
"Posix Threads Programming", [online] Retrieved on Mar. 2, 2005 Retrieved from: http://www.llnl.gov/computing/tutorials/workshops/workshop/pthreads/MAIN.html 29 pages.
Robison, A., "The Abstraction Penalty for Small Objects in C+ + " [online] Retrieved on Apr. 4, 2005 Retrieved from: Http://web.archive.org/web/20030224175656/.

(Continued)

Primary Examiner—Meng-Ai An
Assistant Examiner—Jennifer N To

(57) ABSTRACT

According to at least one embodiment, a method comprises a first thread desiring to perform work using a resource. The first thread determines whether another thread holds a lock on the resource, and if another thread ("blocking thread") holds a lock on the resource, the work is transferred to the blocking thread for performance of the work by the blocking thread using the resource.

12 Claims, 8 Drawing Sheets

OTHER PUBLICATIONS

Dubois, P. "C++ Gets Faster for Scientific Computing" Computers in Physics, vol. 10, No. 5, Sep./Oct. 1996, pp. 458-462.

Grega, W. "Hardware-in-the-loop simulation and its application in control education", 29th ASEE/IEEE Frontiers in Education Conference, Nov. 10, 1999, 6 pages.

Glinksy, E. et al "Modeling and Simulation of Hardware/Software Systems with C++", Proceedings of the 2004 Winter Simulation Conference, pp. 198-205.

U.S. Appl. No. 11/093,827, Non-Final Rejection dated Nov. 12, 2009, pp. 1-13 and attachments.

* cited by examiner

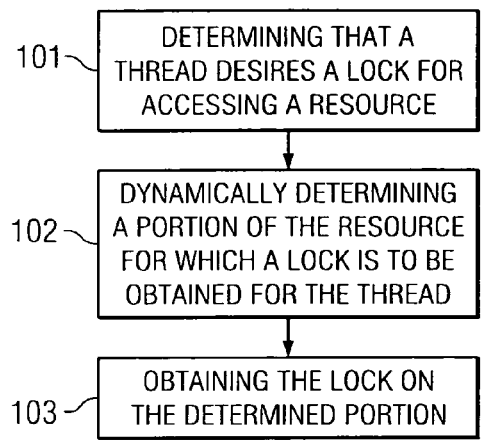
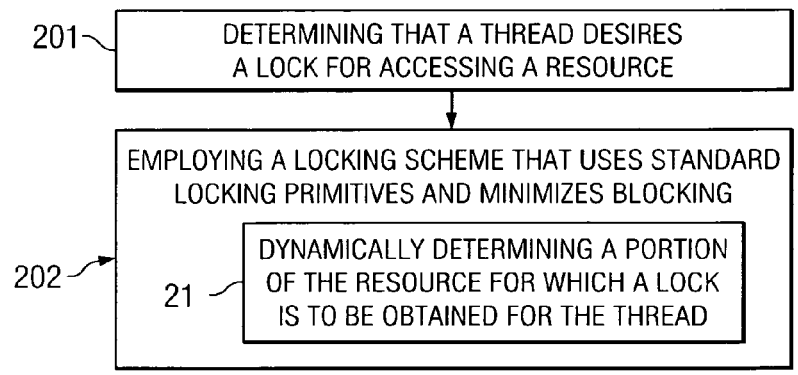
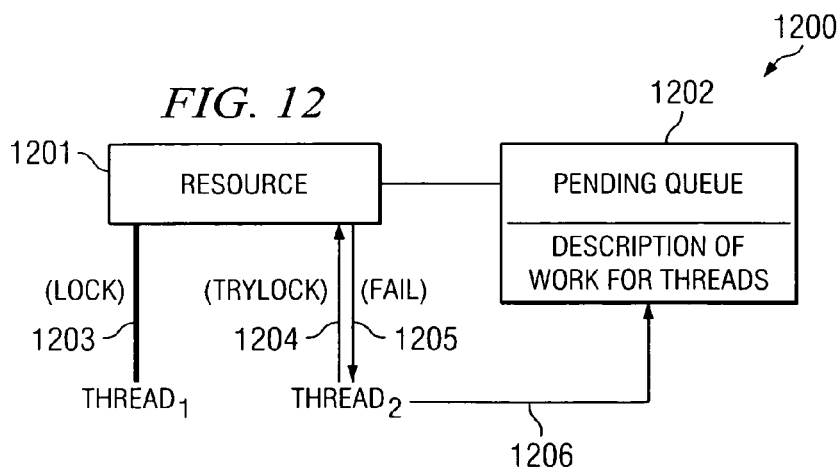

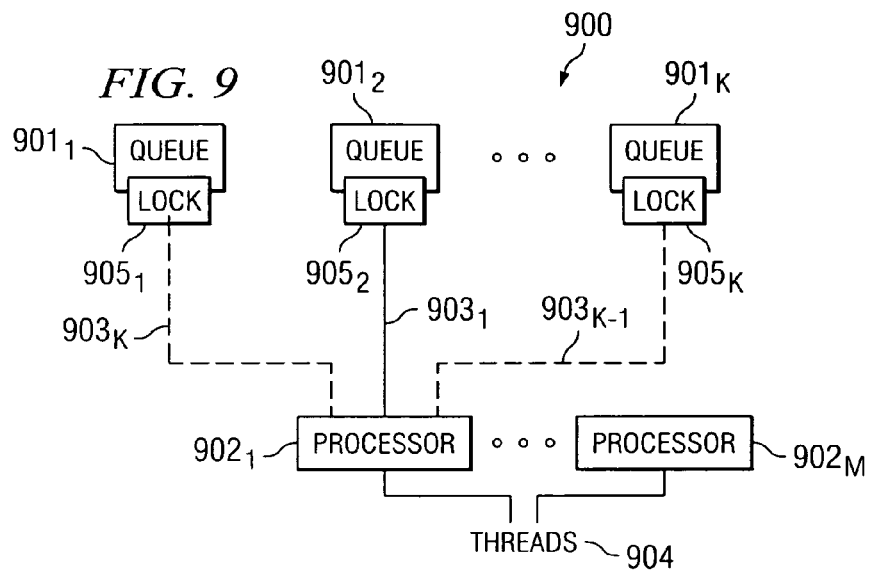
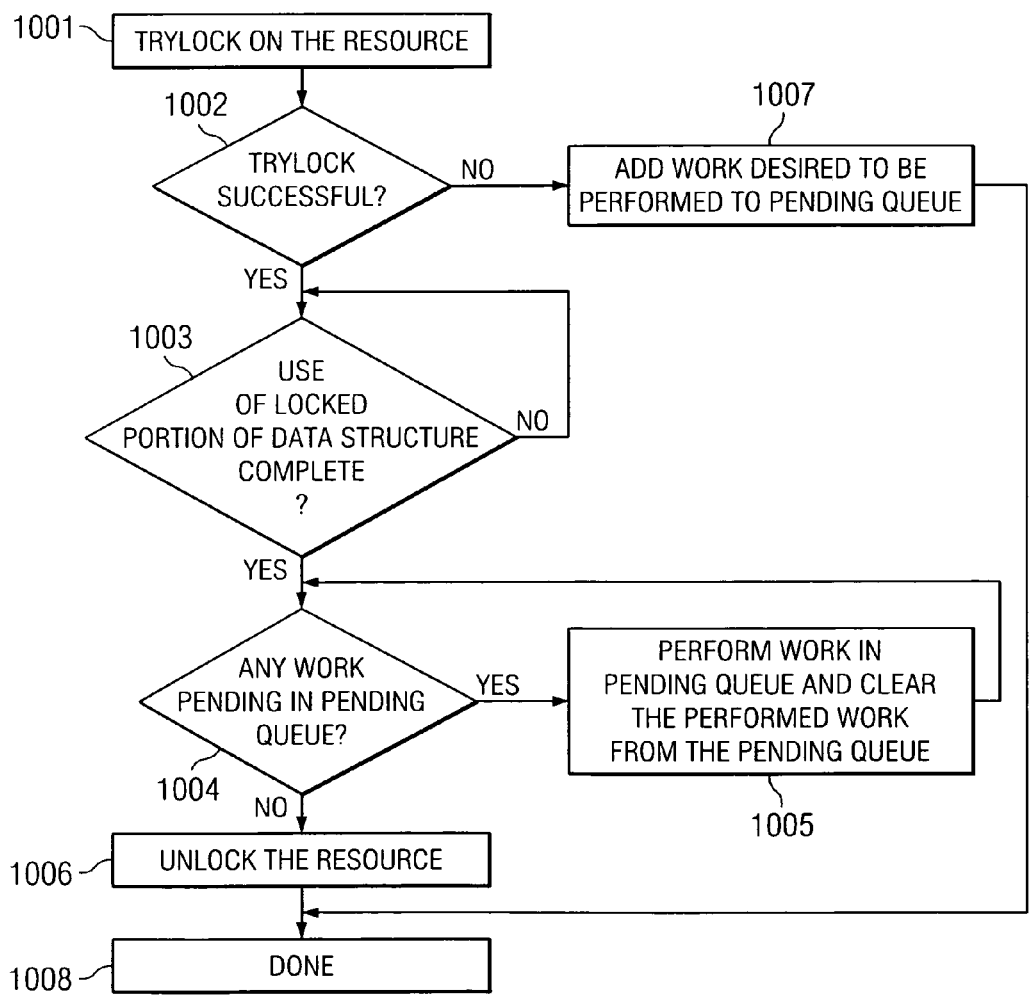

SYSTEM AND METHOD FOR PERFORMING WORK BY ONE OF PLURAL THREADS USING A LOCKABLE RESOURCE

CROSS-REFERENCE TO RELATED APPLICATIONS

The present application is related to concurrently filed and commonly assigned U.S. patent application Ser. No. 11/093, 827 titled "SYSTEM AND METHOD FOR DYNAMICALLY DETERMINING A PORTION OF A RESOURCE FOR WHICH A THREAD IS TO OBTAIN A LOCK" filed Mar. 30, 2005 (now U.S. Patent Publication No. 2006-0225077), the disclosure of which is hereby incorporated herein by reference.

TECHNICAL FIELD

The below description is related generally to locking resources, and more particularly to locking schemes that dynamically determine a thread that is to perform work using a lockable resource.

DESCRIPTION OF RELATED ART

Various systems have resources that may be accessed by different actors (e.g., different processes, threads, etc.), and often it is desirable to provide a mechanism for ensuring that accesses of a resource by different actors do not conflict. As described further herein, "locks" have been developed and used for ensuring that one actor has exclusive access to a resource during the period in which such actor holds a lock for the resource. Locks are commonly employed by operating systems, database management systems (DBMSs), and other resource access management systems for managing access to such resources as memory, input/output (I/O) devices, shared data structures, and other resources of a computer system. As one example of a system in which locking techniques may be employed, locks may be used by a system to handle or allocate requests from different tasks (such as a database operation, file or data record request, register access or use, or a memory access request, as examples) to access or use a data processing system resource, which may be any form of data storage such as a hard disk drive, floppy drive, optical drive (such as a CD-ROM or DVD), random access memory (RAM), or tape drive, as examples). As another example, locks are commonly employed in transaction processing. Transactions are particular kinds of tasks (i.e., streams of activity) that are to be either entirely completed or rolled back. As yet another example, multi-threaded computer systems commonly use locks for managing access to resources shared between some of the threads.

In an environment where multiple streams of executable instructions operate independent of one another, such as in a multi-tasking and multi-threaded operating system, certain operations are desired to be performed by a stream of executable instructions to the exclusion of other streams of executable instructions. It is important in some instances to manipulate data in such a manner that only one processing thread operates thereon with no other stream of executable instructions disturbing the data until the operation is finished. For example, when updating a data structure that is common to the multiple streams of executable instructions, it is desirable that only one stream be making any modifications at a time or otherwise have write-access so that the integrity of the data structure is maintained. In some scenarios, read-access may occur while write-access must only occur in the protected mode. Usually, multiple reads are allowed exclusive of a single thread being allowed access for a write.

One mechanism that is used to protect access to such data structures in a multi-threaded system is known as a "lock" (which may be referred to in some systems by a different name, such as a "mutex"). Standardized programming interfaces have been developed for multi-threaded programming. An example of a known multi-threaded programming interface developed for UNIX systems is that specified by the IEEE POSIX 1003.1c standard (1995). Implementations which adhere to this standard are referred to as POSIX threads or "Pthreads". Most hardware vendors now offer Pthreads in addition to their proprietary Application Programming Interfaces (APIs). Pthreads and other locking techniques are known in the art, which provide standard locking primitives such as "lock," "trylock," and "unlock."

In most multi-threaded systems, a lock must be held or acquired by an executable stream (or thread) in order for the executable stream to proceed through a critical area or segment of its code (e.g., code that is attempting to access a resource for which it desires exclusive access, such as a data structure). After passing through the critical segment, the lock will be released and another executable stream may acquire or hold the lock. If one executable stream holds a lock and another attempts to access or acquire the lock that is already held, the second executable stream will in some way wait upon the lock until it is released by the first executable stream. A stream of executable instructions may wait on a lock in a variety of different manners depending on the system implementation and nature of the stream of executable instructions. For example, in the Windows NT operating system by Microsoft a stream of executable instructions may be a thread in user mode that will sleep upon encountering an unavailable lock that will in turn awaken when the lock later becomes available. As another example, in the Windows NT environment kernel mode operations on a multiprocessor system will encounter "spin" locks that control access to common resources such as memory. It should be noted that spin locks can also be used at the user level. When a spin lock is encountered that is held by another stream of executable instructions on another processor, the encountering processor and stream of executable instructions will simply spin in place and be completely blocked from doing productive work until the spin lock is released. Such waiting can cause degraded system performance, and it is generally desirable to reduce such waiting as much as possible.

Since the lock acts as a gate to allow only one stream of executable instructions to operate for a critical segment at any one time, many executable streams vying for a given lock can lead to contention for that lock. That is, from time to time, lock contention occurs, where one thread attempts to acquire a lock and is forced to wait because another thread holds the lock (i.e., the lock is in use). Lock contention generally degrades the performance of the system, and thus it becomes desirable to minimize the number of occurrences of lock contentions and/or quickly resolve lock contentions. Prior solutions for dealing with lock contention fall into one of a number of categories. First, some solutions attempt to deal with lock contention by reducing the lock hold/critical code section time. The less time taken in a critical section (i.e., that requires a lock on a resource), the less chance of encountering lock contention. So, programmers often attempt to optimize program code to reduce such critical section time. That is, as a general rule, the more often a given lock needs to be accessed, and the longer the lock is held, during the course of normal processing for a given application program or system having multiple streams of executable instructions, the greater the potential for lock contention. Thus, some solutions attempt to minimize the amount of executable instructions while holding a lock. However, in many systems, such as multi-threaded systems, this technique of minimizing the amount of code that is executed while holding a lock has its limits because at some point there will exist portion(s) of code desiring a lock to a resource.

Accordingly, a second solution that has been developed is resource partitioning. In operating systems, it is common to have per-processor locks that allow each processor to operate independently on separate tasks, in some cases without having to hold a lock at all. This solution is possible to implement in an application if the operating system (OS) allows threads to pin themselves to particular processors, but is limited in applicability by these constraints. Per-thread locks are similar. If the number of threads is larger than the number of CPUs, more potential exists for contention and thus hinders efficiency.

Some systems with resource partitioning also include a "work stealing" feature. In the work stealing feature if a particular processor/thread is idle, it will attempt to find another thread with available work and steal some fraction of that work for itself. This solution is complicated by the need to find the other available work, and may reduce the benefit of partitioning by re-introducing an increased need for locking (because a processor of one partition is stealing work from another partition).

Another solution is use of non-blocking data structures. Some processor architectures allow for data structure updates (in certain circumstances) to happen without any blocking at all, guaranteeing that progress is being made on some thread. This solution is limited by processor support for the appropriate atomic operations, and substantially limited by the type of operations that can be performed. Also, this solution requires special (non-standard) locking primitives.

In view of the above, a desire exists for a locking scheme where threads can usually avoid blocking while still using standard locking primitives, such as "lock," "trylock," and "unlock."

BRIEF DESCRIPTION OF THE DRAWINGS

FIG. 1 shows an exemplary operational flow diagram for a locking scheme that employs bypass locking in accordance with embodiments of the present invention;

FIG. 2 shows another operational flow diagram according to which certain embodiments of the present invention operate;

FIG. 9 shows an exemplary system in which the locking algorithm of FIG. 8 may be applied;

FIG. 10 shows a second general exemplary embodiment of a bypass locking algorithm;

FIG. 12 shows an exemplary system in which the locking algorithm of FIG. 11 may be applied.

DETAILED DESCRIPTION

Figure 3:
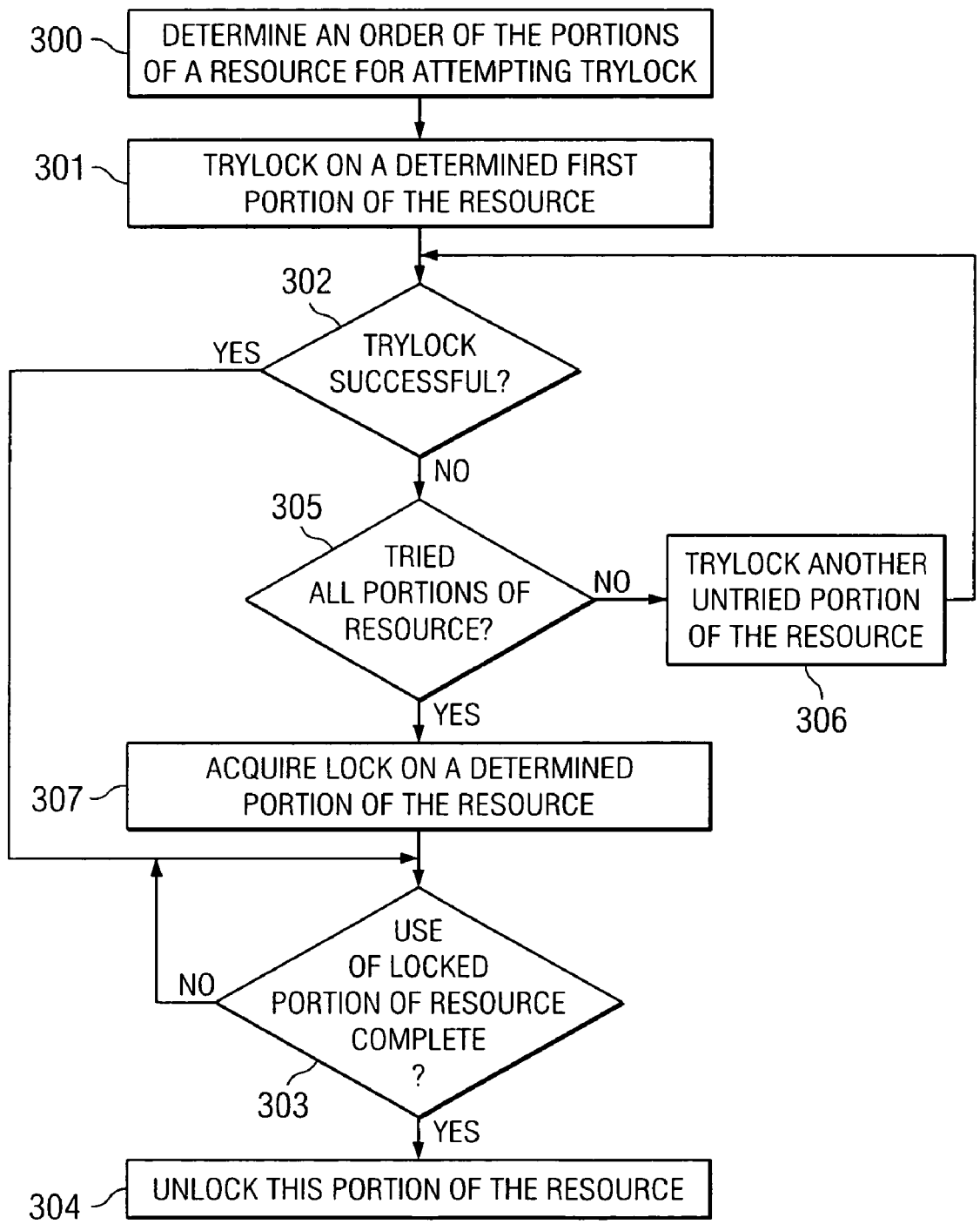
FIG. 3 shows a first general exemplary embodiment of a bypass locking algorithm.

Embodiments of the present invention provide a locking scheme, which may be referred to herein as "bypass locking," which uses a dynamic locking mechanism. Such dynamic locking mechanism enables a thread to dynamically determine a portion of a data structure to lock, rather than being statically assigned to locking a given data structure. Such dynamic locking mechanism enables the locking scheme to go around (or "bypass") what would traditionally be a single lock such that a thread trying to acquire the lock is still able to make forward progress. Further, as described below, in certain embodiments bypass locking is employed to enable a locking scheme that uses standard locking primitives, such as "trylock," "lock," and "unlock" in a manner that minimizes blocking.

Threads-based programming is a known technique that enables an activity generated by program code to proceed asynchronously with respect to other activities executing in the computer system. In general, a "thread" refers to a single execution stream of an executing program. In other words, a thread is a stream of instructions being executed by a processor. In a multi-threaded environment, several paths in an executing program may be executing simultaneously. That is, software that is multi-threaded has multiple threads of control that cooperate to perform a task. Threads may be programmed to execute sequentially or concurrently. A software program can be decomposed into multiple threads with the purpose of achieving improved performance through parallel execution of those threads. Many computer systems include multiple processors and therefore concurrent execution of threads-based programs may also take advantage of the hardware concurrency built into such multi-processor computer systems. The concurrent operation of a threads-based program creates a desire to safeguard the state of variables associated with the threads-based program while the threads-based program is accessing computer memory.

Programmers sometimes use a program-modularization technique, often referred to as multiprogramming, for splitting a program in to multiple cooperating processes. Thus, a program may be implemented as a plurality of cooperating programs or routines connected by a well defined interprocess communication using, for example, shared memory. In such case, locks may be used for managing access by the cooperating processes to the shared memory.

As mentioned above, standardized programming interfaces have been developed for multi-threaded programming, such as Pthreads. Of course, other multi-threaded techniques are known, and the concepts presented herein are not limited to any given technique but may instead be employed with any suitable multi-threaded programming technique now known or later developed.

When multiple threads are interdependent, each thread may access state that is associated with the other threads, as well as wake up threads waiting for some condition. A consistent state may be maintained for the variables in an object or process associated with a thread by methods such as synchronizing the operations of associated threads or safeguarding the operations associated with the threads. The term "state" in this regard refers to the value associated with a variable that is maintained in a consistent manner. For example, shared computer memory is accessible by two or more threads; and thus multi-threaded programs should acquire locks to portions of the computer memory in order to access the shared data in the appropriate manner.

As described above, typically a lock is created to ensure that access to a region, or portion, of the computer memory is safeguarded. Locks tend to be implemented to protect a logical structure, e.g. a linked list rather than specific addresses. When programs are multithreaded in this way, locks are typically used to control access to shared data. For example, a lock may be implemented as a special memory location that is assigned to a section of data, wherein the special memory location controls access to the assigned section of data, and wherein a thread can only update such section of data when it owns the lock. This is referred to as "mutexes" (mutual exclusion) in Pthreads.

In certain embodiments of the present invention, a dynamic locking mechanism is used to enable a scheme to be employed that uses standard locking primitives, such as "trylock" (which tries to obtain a lock and then immediately returns a boolean variable indicating if acquisition was successful), "lock," and "unlock," while minimizing blocking. Such standard locking primitives are available in different forms in many locking schemes, such as those employed by Pthreads, various OSs, database management systems, etc. While the specific terminology and implementation of these primitives may vary from implementation to implementation (e.g., from OS to OS), the use of "lock", "unlock", and "trylock" herein is intended to encompass any corresponding locking primitive of a given implementation, irrespective of the specific name used in the given implementation for referring to such primitive.

Such a bypass locking scheme may be employed in any system/environment that employs locking, such as operating systems, database management systems, transactional systems, etc. Further, various forms of the dynamic locking feature may be employed depending on the characteristic of the system (e.g., characteristics of the resources being locked, the access pattern, etc.). Three exemplary algorithms utilizing such dynamic locking feature are described further herein. First, an exemplary bypass locking algorithm that may be particularly useful for reserved resources is described (see e.g., FIGS. 4-5). Second, an exemplary bypass locking algorithm that may be particularly useful for high-contention locks is described (see e.g., FIGS. 7-8). Third, an exemplary bypass locking algorithm that may be particularly useful for non-partitionable accessing to a data structure is described (see e.g., FIGS. 10-11). Each of these exemplary algorithms allows for a thread that desires to access a shared data structure to access a piece of it, and usually be able to avoid blocking. Further, these exemplary algorithms allows for this to be achieved through the use of standard locking primitives (namely lock, trylock, and unlock). Of course, while specific exemplary algorithms employing bypass locking are described herein, the scope of the present invention is not limited to those specific algorithms, but rather those algorithms are intended merely as examples and the bypass locking concept may be applied within any algorithm for implementing a locking scheme. Also, while the algorithms are described as being particularly useful for certain types of resources and/or access patterns, the algorithms may be employed for any resource/access pattern as may be desired.

Before describing specific exemplary algorithms that employ bypass locking, a general overview of bypass locking is first described. FIG. 1 shows an exemplary operational flow diagram for a locking scheme that employs bypass locking. In operational block 101, the scheme determines that a thread desires a lock for accessing a resource. As described further herein, such resource may be a resource that is shared among a plurality of threads. That is, any of a plurality of threads may access the resource. In certain embodiments, the lockable resource (e.g., data structure) is partitioned into a plurality of partitions that are each lockable (i.e., a lock is defined for each of the plurality of partitions). In operational block 102, the scheme dynamically determines a portion of the resource for which a lock is to be obtained for the thread. Thus, the thread is not statically pre-assigned a portion of the resource that it is to lock, but rather the portion to be locked by the thread is dynamically determined. As described further herein, such portion to be locked by the thread may be determined on each attempted access of the resource by the thread. In operational block 103, the thread obtains the lock for the determined portion.

Some traditional schemes for partitioned resources use a static partitioning of access (each thread/CPU has its own work queue). However, the pending work may be periodically rebalanced between the queues. This can happen in either 1) when a thread has no work to do, or 2) based on some interval. In the first case (i.e., when a thread has no work to do), the thread will lock the queues owned by each other thread, and remove some of the pending work (usually half) and move that work to its own queue. This process is usually called work stealing. In the second case (i.e., interval-based), a possibly separate thread periodically evaluates the amount of pending work in each queue and moves work between queues as appropriate. This case usually occurs for CPU schedulers, and the rebalancing scheme weighs the benefit of moving the CPU load against the cost of the cache misses. As described further herein, embodiments of bypass locking, on the other hand, has no notion of an "owner" (i.e., an owning thread) of any of the portions of a resource, thus allowing fewer partitions, while also minimizing blocking.

As described further herein, the bypass locking scheme may be employed to minimize blocking, while using standard locking primitives such as lock, trylock, and unlock. Using such standard locking primitives is advantageous because it allows better portability. That is, the bypass locking scheme described herein is not architecture-specific, but can instead be employed on many different architectures that support such standard locking mechanisms as lock, trylock, and unlock. FIG. 2 shows another operational flow diagram according to which certain embodiments of the present invention operate. In operational block 201, it is determined that a thread desires a lock for accessing a resource. In operational block 202, a locking scheme is employed that uses standard locking primitives and minimizes blocking. As shown in sub-block 21 of block 202, such minimization of blocking while using standard locking primitives may be enabled by the locking scheme dynamically determining a portion of the resource for which a lock is to be obtained for the requesting thread.

As mentioned above, dynamic locking algorithms may be applied in different forms depending on the characteristics of the system/environment in which the locking scheme is employed. Two general exemplary embodiments of bypass locking algorithms are described herein with FIGS. 3 and 10. Exemplary implementations of the embodiment of FIG. 3 are described with FIGS. 4-6 and 7-9, and an exemplary implementation of the embodiment of FIG. 10 is described with FIGS. 11-12.

A first exemplary embodiment of bypass locking is shown in FIG. 3. In operational block 300, an order of the portions of a resource (e.g. shared data structure) in which trylock is to be attempted is determined. The order in which a requesting thread is to attempt trylock on the portions of a resource may be determined as a sequential order, random order, or otherwise as described further below. Also, in certain embodiments the entire order need not be initially determined in block 300, but rather a portion of the resource for which the thread is to initially attempt trylock may be determined in block 300 and the order of later portions for which the thread is to attempt trylock (if needed) may be dynamically determined later.

In operational block 301, the thread desiring to access the resource uses trylock on the determined first portion of the resource. As mentioned above, the trylock locking primitive tries to obtain a lock and then immediately returns a variable indicating if acquisition was successful. If trylock is successful, it acquires the lock. As described further below, in certain implementations the determined first portion may be a defined first portion (e.g. a designated first one of a sequence of portions), while in other implementations the determined first portion may be the portion last successfully accessed by the thread. Of course, the first portion of the resource for which trylock is attempted may be determined in any manner.

In block 302, the thread, determines whether the trylock was successful in acquiring a lock on the first portion of the resource. If it was successful, then the lock is held, and operation advances to block 303 whereat the thread uses the locked portion of the resource. When determined in block 303 that use of the locked portion of the resource is complete, the thread unlocks (using the unlock primitive) this portion of the resource in block 304.

If determined in block 302 that the trylock was not successful, operation advances to block 305 where it is determined whether the trylock has been attempted for all portions of the resource. If not, trylock is attempted on another untried portion of the resource in operational block 306, and operation then returns to block 302 and proceeds as described above. The next untried portion for which trylock is attempted in block 306 may be selected in any manner. In certain embodiments, the next untried portion to be attempted is selected according to a predetermined order, such as an order determined in block 300. For example, in certain embodiments the portion sequentially following the previously tried portion is selected. In other embodiments such next portion to be attempted is selected randomly. Again, the next untried portion to be attempted may be selected in any manner desired for a given algorithm.

If determined in block 305 that the trylock has been attempted for all portions of the resource, operation advances to block 307 whereat the thread waits until the lock is acquired for a determined portion of the resource and then operation advances to block 303 and proceeds as described above. As described further below, the determined portion for which a lock is acquired in block 307 may be a predetermined portion, such as the last portion in a sequence of portions or the portion last successfully accessed by the thread, as examples.

The above operational flow of FIG. 3 provides one general exemplary embodiment of the bypass locking technique in which a portion of the resource (e.g. shared data structure) for which a lock is obtained for a given thread is dynamically determined. As described further below, implementations of this embodiment may be adapted for implementing a locking scheme for a reserved resource or for implementing a locking scheme for high-contention resources, as examples.

A first exemplary implementation of the above embodiment of bypass locking may be used for reserved resources. In general, reserved resources are resources for which more can be requested from the system (usually in bulk for efficiency) and holding the resources unused while getting more from the system reduces overall efficiency. A common example of a reserved resource is memory for any use, such as buffers for input/output (I/O) in a system. Thus, a first implementation of bypass locking, described further hereafter, may be used for handling buffer allocation for I/Os. In a traditional system, there is typically a shared pool of buffers (potentially pre-allocated to reduce startup costs) which are protected by a buffer pool lock. When a thread desires to access a buffer in a traditional system, it executes according to the following pseudocode:

1. bufferpool.lock( );
2. if no available memory in buffer pool, get M MB from the kernel;
3. take a buffer of the appropriate size from the free-list for that size;
4. bufferpool.unlock( ).

In step 1 above, the thread attempts to take a lock on the buffer pool using the "lock" primitive. In step 2, if no available memory is in the buffer pool, the thread gets M MB from the kernel. Available memory may not be available in the buffer pool because, for example, it may have all been taken by other threads. In step 3, the thread takes a buffer of the appropriate size from the free-list (the list of free buffers) for that size. In step 4, the thread unlocks the buffer pool using the "unlock" primitive. Thereafter, the thread uses the buffer for buffering the amount of data desired to be buffered by the thread. Thus, in this example, the buffer pool is shared by all of the threads, but once a thread "takes" a buffer of a desired size, that thread has exclusive access to the taken buffer (because the taken buffer is no longer available on the "free-list") and thus the thread no longer needs a lock on the buffer pool. However, a lock is needed when trying to "take" a buffer to ensure that different threads do not take the same buffer.

To free a buffer in a traditional system, the thread would execute according to the following pseudocode:

1. bufferpool.lock( );
2. return buffer to free-list of appropriate size;
3. bufferpool.unlock( ).

In step 1 above, the thread attempts to take a lock on the buffer pool using the "lock" primitive. In step 2, the thread returns the buffer to the free-list of appropriate size. In step 3, the thread unlocks the buffer pool using the "unlock" primitive.

A problem with the above-described traditional locking scheme is that if too many threads all try to get memory (a buffer in the above example) at the same time, they will all be waiting on the lock. This contention will reduce performance and increase latency. A traditional solution to this problem is to statically partition the threads across a number of buffer pools. That is, the buffer pool may be partitioned into a number of buffer pools, and each thread is statically assigned to using a given one of the buffer pools.

Figure 4:
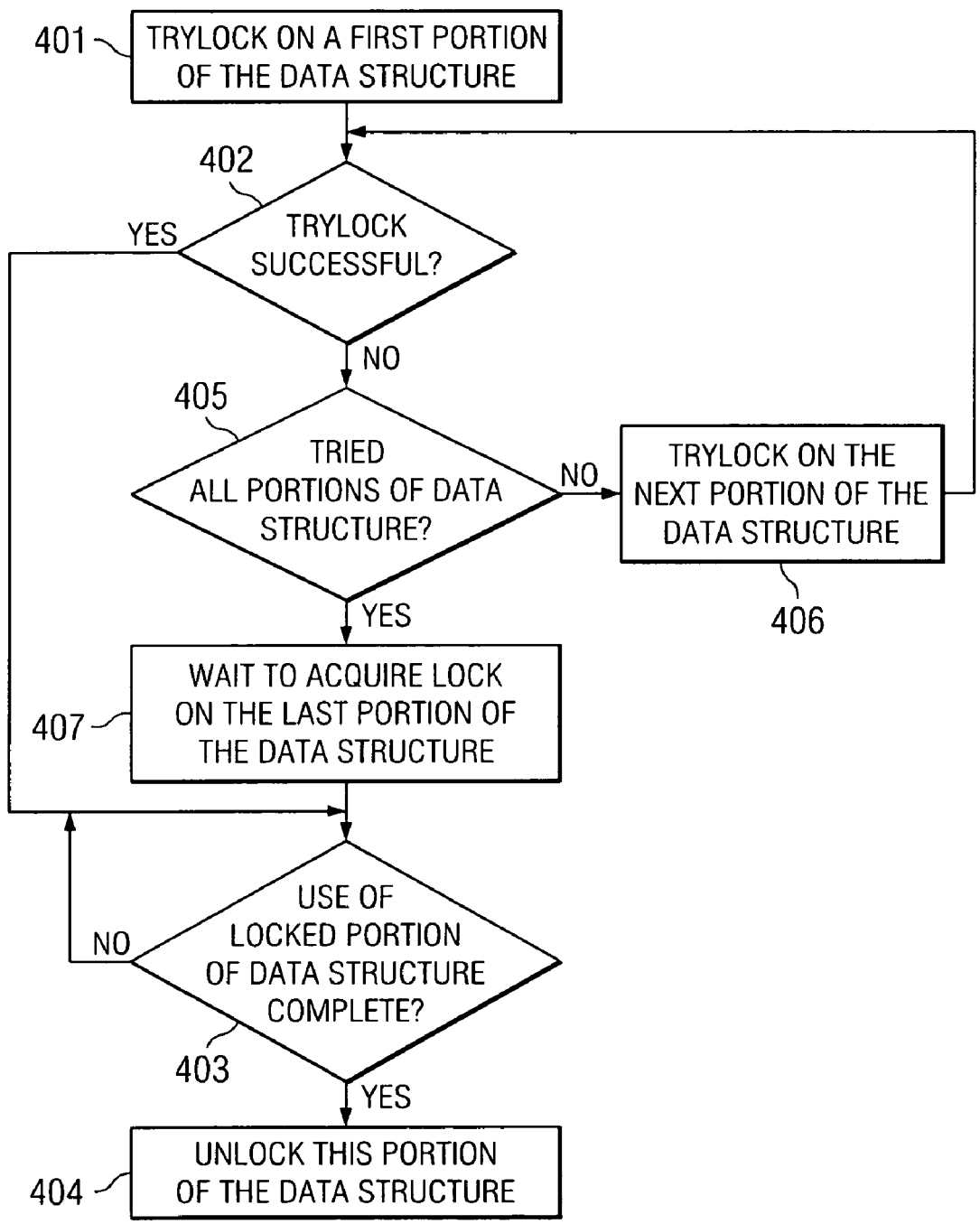
FIG. 4 shows an operational flow for an exemplary locking scheme according to the embodiment of FIG. 3 that may be employed for a reserved resource, such as an I/O buffer pool.

Instead of statically partitioning the threads across a number of portions of a data structure, such as a number of different buffer pools, bypass locking may be utilized to dynamically determine a portion (e.g., partition) of a data structure for which a given thread is to take a lock on. For example, FIG. 4 shows an exemplary operational flow for a locking scheme that may be employed for a reserved resource, such as an I/O buffer pool, in accordance with one exemplary implementation of the embodiment of FIG. 3. In this implementation, the data structure is logically divided (e.g., partitioned) into different portions (or "partitions") that are separately usable by threads, wherein a lock is provided for locking each portion of the data structure. For instance, an I/O buffer pool may be divided into a plurality of buffer pools that are each individually lockable. However, rather than a thread being statically assigned to a given portion of the data structure (e.g. a given buffer pool), a dynamic determination is made as for which portion the thread is to obtain a lock. As described further below, this determination can be made on each attempted access of the data structure by the thread.

In operational block 401, the thread desiring to access the data structure uses trylock on a first portion of the data structure. As mentioned above, the trylock locking primitive tries to obtain a lock and then immediately returns a variable indicating if acquisition was successful. If successful, the lock is acquired. In block 402, the thread, determines whether the trylock was successful in acquiring a lock on the first portion of the data structure. If it was successful, then the lock is held, and operation advances to block 403 whereat the thread uses the locked portion of the data structure. When determined in block 403 that use of the locked portion of the data structure is complete, the thread unlocks (using the unlock primitive) this portion of the data structure in block 404.

If determined in block 402 that the trylock was not successful, operation advances to block 405 where it is determined whether the trylock has been attempted for all portions of the data structure. If not, trylock is attempted on the next portion of the data structure in operational block 406, and operation then returns to block 402 and proceeds as described above. If determined in block 405 that the trylock has been attempted for all portions of the data structure, operation advances to block 407 whereat the thread waits until the lock is acquired for the last portion of the data structure and then operation advances to block 403 and proceeds as described above.

In view of the above, this exemplary implementation sequentially advances through the portions (e.g., partitions) of the data structure attempting trylock for each portion until the trylock is successful, at which point a lock is taken for the portion for which the trylock is successful. If trylock is not successful for any of the portions, this exemplary scheme waits for the lock to become available for the last portion, and then takes the lock on the last portion. Accordingly, this is one example of the bypass locking technique in which a portion of the data structure for which a lock is obtained for a given thread is dynamically determined.

The above scheme of FIG. 4 may be applied, for example, for managing access to a number of different buffer pools. For instance, instead of statically partitioning the threads across a number of different buffer pools as in the above-described traditional scheme, bypass locking may be utilized to dynamically determine a buffer pool for which a given thread is to take a lock. Consider, for example, an implementation in which a constant k is defined as the number of buffer pools (referred to as buffer pools 0 through k−1), and bypass locking is employed according to the algorithm shown in FIG. 5.

Figure 5:
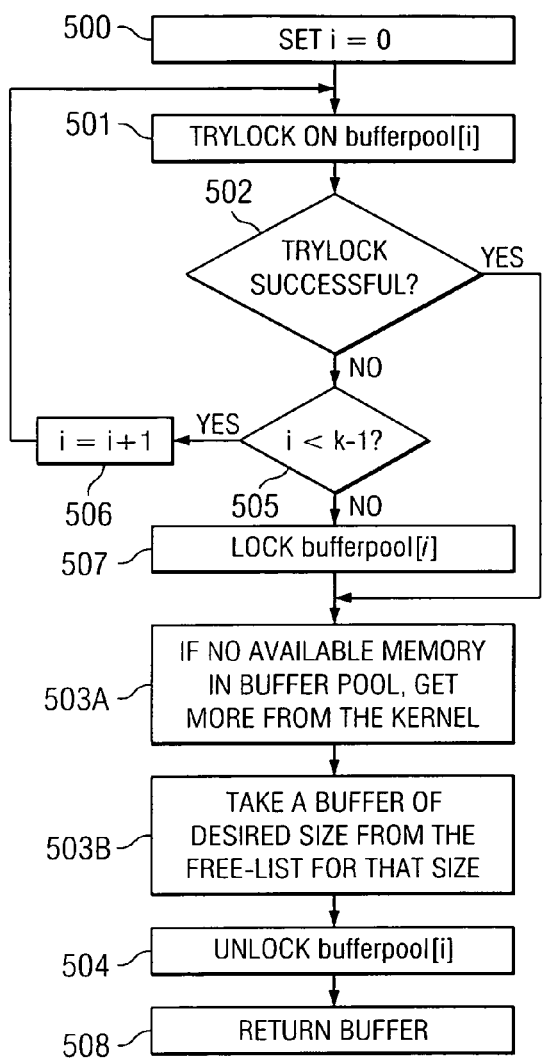
FIG. 5 shows an operational flow diagram for one implementation of the locking scheme of FIG. 4 in greater detail.

In operational block 500 of FIG. 5, a variable i is set to 0. In operational block 501, a trylock is attempted on the bufferpool[i]. Thus, because i is initialized to 0, trylock is initially attempted for the first buffer pool, bufferpool[0]. In block 502, the thread, determines whether the trylock was successful in acquiring a lock on bufferpool[i]. If it was successful, then the lock is held, and operation advances to blocks 503A and 503B whereat the thread uses the locked bufferpool[i]. More specifically, in this example, in block 503A if there is no available memory in the buffer pool, the thread gets more memory for the buffer pool from the kernel. In one implementation, the thread gets $M/(4^i)$ MB memory from the kernel in block 503A if there is no available memory in the buffer pool. Accordingly, in block 503A the thread may get more buffers (memory) from the kernel; in particular: $M/(4^i)$ MB of memory which can then be split into buffers. In block 503B, the thread takes a buffer of the appropriate size from the free-list for that size. After use of the buffer by the thread is complete, the thread unlocks the bufferpool[i] in operational block 504, and returns the buffer to the caller for unlocked use in block 508.

If determined in block 502 that the trylock was not successful, operation advances to block 505 where it is determined whether i<k−1. That is, it is determined whether the trylock has been attempted for the first k−1 buffer pools. If i<k−1 (i.e., the trylock has not been attempted for the first k−1 buffer pools), i is incremented by 1 in block 506, and operation returns to block 501 whereat trylock is attempted on bufferpool[i] (i.e., trylock is attempted for the next sequential buffer pool). If determined in block 505 that i is not less than k−1, operation advances to block 507 whereat the thread waits until the lock is acquired for bufferpool[k−1], i.e., the last buffer pool in the sequence. Then operation advances to block 503A and proceeds as described above using bufferpool[k−1].

The exemplary scheme of FIG. 5 can be represented by the following pseudocode:

```
1.   // First, try to get the data from a non-blocking one of the pools...
2.   for(int i=0; i<k-1; i++){
        a.   if (bufferpool[i].trylock( )){
                i.    if no available memory in buffer pool, get M/(4^i) MB from kernel;
                ii.   take a buffer of the appropriate size from the free-list for that size;
                iii.  bufferpool[i].unlock( );
                iv.   return buffer;
        b.}
3.}
4. // all pools were unavailable, force-use (wait on) the last one
5. bufferpool[k-1].lock( );
6. if no available memory in buffer pool, get M/(4^(k - 1)) MB from the kernel;
7. take a buffer of the appropriate size from the free-list for that size;
8. bufferpool[k-1].unlock( );
9. return buffer.
```

The algorithm for freeing data may be implemented analogous to that described above. It should be recognized that this means that a buffer allocated originally from one buffer pool can be returned to a different buffer pool. This is not a problem. The rationale for allocating less memory for the later buffer pools is that they are expected to be used significantly less than the first buffer pool. The example of $M/(4^i)$ could be adjusted to any other values based on the expected contention, although significantly decreasing values are recommended for most systems. The algorithm may instead be implemented to track the amount of usage each buffer pool is getting and make the allocation proportional to usage. The allocation of memory to buffer pools may be implemented in any manner desired, and is not intended to limit the scope of application of the exemplary locking algorithms described herein. In certain systems, for instance, it may be desirable to have the first two pools allocated M MB of memory. The choice of k (i.e., the number of buffer pools) is dependent on the expected usage, but could also be dynamically determined by the system. Such value of k may be tunable such that it grows when the "fall-through case" of unconditionally locking the last buffer pool is occurring too many times (e.g., exceeds a defined threshold). In this case, an array of pointers may be pre-allocated to the buffer pools, and a separate lock may be provided for the dynamically created buffer pools. These steps are desired so as to not introduce another lock to determine the number of available buffer pools before performing an allocation. It should be noted that in certain implementations a lock may be implemented to control adding another buffer pool.

As a variant to the exemplary scheme described above, in certain implementations this scheme may be implemented such that it makes a first pass through the pools attempting trylock and attempts to obtain the desired memory only from the free-list for any pool for which the trylock is successful. If the desired memory is not obtained on the first pass, then the thread makes a second pass through the pools attempting trylock and obtains the desired memory from the free-list for a pool for which the trylock is successful or from the kernel if the pool for which the lock is obtained does not have the desired memory available. If the desired memory is not obtained on the first or second pass, then the thread makes a third pass in which it forces a lock on the last pool and attempts to obtain the desired memory from either the free-list or the kernel. This variation may be desirable if asking for more of the resource (memory in this case) from the kernel is undesirable for some reason, such as because of slowing the system or because the resource is very limited. This variation is represented by the following exemplary pseudocode:

```
1.  // First Pass: try to get the memory from a free-list of a non-blocking one of the pools
2.  for(int i=0; i<k-1; i++){
    a.  if (bufferpool[i].trylock( )){
        I.  if (buffer of appropriate size available in free-list) {
            i.  take a buffer of the appropriate size from the free-list for that size;
            ii. bufferpool[i].unlock( );
            iii. return buffer;
        II. } else {
            i.  bufferpool[i].unlock( );
        III. }
    b. }
3.  }
4.  // Second Pass: try to get memory from a free-list or the kernel for a non-blocking pool
5.  for(int i=0; i<k-1; i++){
    a.  if (bufferpool[i].trylock( )){
        i.   if no available memory in buffer pool, get $M/(4^i)$ MB from kernel;
        ii.  take a buffer of the appropriate size from the free-list for that size;
        iii. bufferpool[i].unlock( );
        iv.  return buffer;
    b. }
6.  }
7.  // Third Pass: all pools were unavailable, force-use (wait on) the last one
8.  bufferpool[k-1].lock( );
9.  if no available memory in buffer pool, get $M/(4^{k-1})$ MB from the kernel;
10. take a buffer of the appropriate size from the free-list for that size;
11. bufferpool[k-1].unlock( );
12. return buffer.
```

Figure 6:
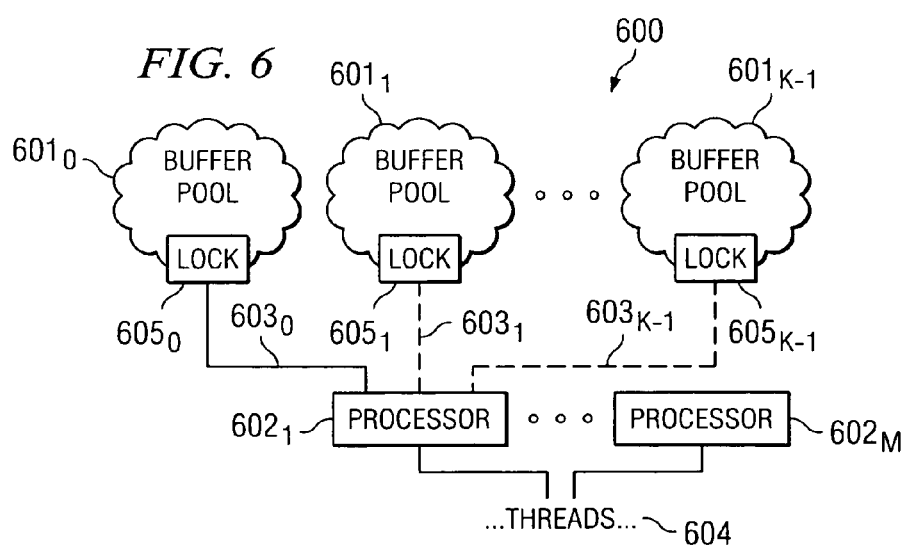
FIG. 6 shows an exemplary system in which the locking algorithm of FIG. 5 may be applied.

An exemplary system 600 in which the above algorithm may be applied is shown in FIG. 6. System 600 includes k buffer pools, shown as buffer pools $601_0$, $601_1$, . . . , $601_{k-1}$. System 600 further includes one or more processors, such as processors $602_1$, . . . , $602_M$, that are each executing one of threads 604. In this example, a thread being executed by processor $602_1$, desires a lock on a buffer pool. Thus, as described above, the thread first attempts $603_0$ to obtain a lock ($605_0$) on first buffer pool $601_0$ (i.e., determines via trylock whether a lock is available for such first buffer pool $601_0$). If the lock $605_0$ is not available for the first buffer pool $601_0$, then the thread next attempts $603_1$ to obtain a lock ($605_1$) on second buffer pool $601_1$ (i.e., determines via trylock whether a lock is available for such second buffer pool $601_1$). As described above, the thread continues in this manner, sequentially stepping through each of the buffer pools until trylock is successful. If after attempting $603_{k-1}$ to obtain a lock ($605_{k-1}$) on the last buffer pool $601_{k-1}$, the thread determines via trylock that a lock is not available for such last buffer pool $601_{k-1}$, the thread waits for the lock $605_{k-1}$ to become available for this last buffer pool $601_{k-1}$.

The above algorithm is particularly useful if the resources being protected by the lock are tied up separately in each instance. For instance, in the exemplary buffer pool implementation described above, the lock for each buffer pool protects the collection of buffers in the corresponding buffer pool. Accordingly, the buffers ("resources") are tied up when a lock on the buffer pool is held by a thread. The buffers can be independently used, just not while they are in a pool (i.e. they have to be removed first). That is, the buffers have to be removed from the free-list of a buffer pool before being used. The most common case in which resources being protected by a lock are separately usable in this manner is memory allocation, both in the form of main memory, descriptors on an external card, or pageable memory, such as on a graphics card. This form of tied-up resources could also occur for reservations on disk space. The above-described scheme of allocation allows for most of the resources to be kept in a single pool so that none of the available resources are unavailable, but provides a way to bypass contention for the shared lock when such contention occurs.

The exemplary algorithm described above with FIGS. 5 and 6 which employs bypass locking for reserved resources keeps most of the activity on the first portion (e.g., first partition) of the logically divided resources. However, it has the potential downside that if there is usually a lot of contention, then a lot of time can be spent calling trylock and failing. While still better than blocking, this may be expensive and inefficient. Accordingly, another exemplary implementation of the bypass locking embodiment of FIG. 3 that is particularly useful for high-contention locks is now described. Consider, for example, a system that logically implements a central priority queue of pending events. Traditionally, such a system may be implemented by a priority queue protected by a single lock, or potentially by statically partitioning the different threads across separate priority queues. However, in this case, if all the activity was from a single set of threads, then the performance would be no better than with a single lock. Bypass locking may be employed in such a high-contention system for dynamically determining which lock to obtain for a given thread so as to bypass the contention.

Figure 7:
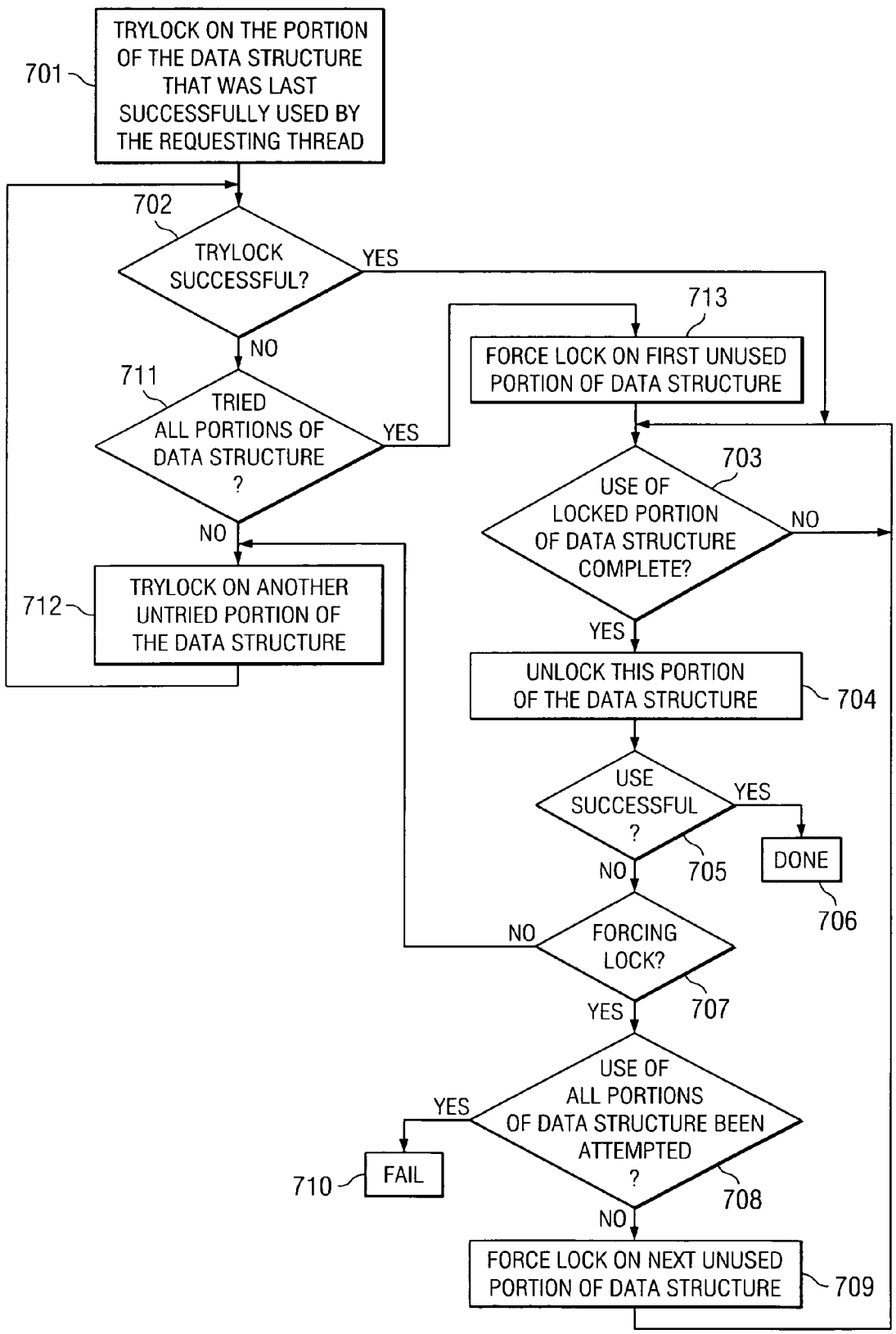
FIG. 7 shows an operational flow for another exemplary locking scheme as an extension to the embodiment of FIG. 3 that may be employed for high-contention locks, such as a priority queue for pending events.

For example, FIG. 7 shows an exemplary operational flow for a locking scheme that may be employed for high-contention locks, such as a priority queue for pending events, in accordance with one implementation of the embodiment of FIG. 3. In this exemplary implementation of a locking scheme, the data structure (e.g., priority queue) is logically divided (e.g., partitioned) into different portions (or "partitions"), wherein a lock is available for each of the portions of the data structure. However, rather than a thread being statically assigned to a given portion, a dynamic determination is made as for which portion the thread is to obtain a lock. As described further below, this determination can be made on each attempted access of the data structure by the thread.

In operational block 701, the thread desiring to access the data structure uses trylock on a portion of the data structure that the thread last successfully used. In certain embodiments, if no such last successfully used portion of the data structure exists for the thread (i.e. this is the first time the thread accesses the data structure), the thread may use trylock on a first portion of the data structure and sequentially step through each portion until trylock is successful, as in the above-described exemplary implementation of FIG. 4. As mentioned above, the trylock locking primitive tries to obtain a lock and then immediately returns a variable indicating if acquisition was successful. In block 702, the thread determines whether the trylock was successful in acquiring a lock on this portion of the data structure. If determined in block 702 that the trylock was not successful, operation advances to block 711 where it is determined whether the trylock has been attempted for all portions of the data structure. If not, trylock is attempted in operational block 712 on another untried portion of the data structure (e.g., the next sequential portion of the data structure, a randomly selected untried portion, etc.), and operation then returns to block 702 and proceeds as described further below.

If determined in block 711 that the trylock has been attempted for all portions of the data structure, operation advances to block 713 whereat the algorithm begins a forcing lock procedure. That is, in block 713 the thread waits until the lock is acquired for a first unused portion of the data structure. Once this lock is acquired, operation advances to block 703 and proceeds as described below.

If trylock is successful in block 702, or once a lock is forced in block 709 or 713, the lock is held and operation advances to block 703 whereat the thread uses the locked portion of the data structure. When determined in block 703 that use of the locked portion of the data structure is complete, the thread unlocks (using the unlock primitive) this portion of the data structure in block 704.

In block 705, the thread determines whether its use of the previously locked portion of the data structure was successful. For example, the thread may desire to perform removal of data from the data structure, and the portion of the data structure for which a lock was obtained may not possess the data desired to be removed. If the use of the data structure for the desired operation of the thread was successful, the algorithm completes in block 706. If the use was not successful, operation advances to block 707 where the algorithm determines whether it is forcing locks. That is, the algorithm determines whether it has completed trylock for all portions of the data structure and is now executing its forcing locks procedure to force a lock on portions of the data structure for which use has not yet been attempted by the thread. If determined that the algorithm is not executing its forcing locks procedure, operation advances to block 712 and continues as described above.

If determined in block 707 that the algorithm is executing its forcing locks procedure, operation advances to block 708 where the algorithm determines whether all portions of the data structure have been used. If all portions of the data structure have been used, the algorithm determines in block 710 that the operation desired by the requesting thread has failed. If determined in block 708 that all portions of the data structure have not been used, operation advances to block 709 whereat the algorithm forces a lock on the next unused portion of the data structure. That is, in block 709 the thread waits until the lock is acquired for a next portion of the data structure that has not yet been used by the requesting thread for this pending request. Once this lock is acquired, operation returns to block 703 and proceeds as described above.

In view of the above, this exemplary embodiment advances through the portions of the data structure (in some determined order, such as sequential, a random per-thread shuffle, or other order), starting with the portion last successfully accessed by the requesting thread, attempting trylock for each portion until the trylock is successful, at which point a lock is taken for the portion for which the trylock is successful. When a lock is acquired, the thread attempts to use the locked portion for its desired operation, and then the lock is released and the locking scheme determines whether the attempted use was successful. If the attempted use was successful, then the algorithm completes for this thread's request, otherwise the algorithm continues and attempts trylock on another portion of the data structure for which trylock has not yet been attempted. If trylock has been attempted for all portions of the data structure with no successful use for the operation desired by the thread, the locking scheme then begins a forcing lock procedure in which it steps through any previously unused portions of the data structure and forces a lock for each such portion until use of a portion for the operation desired by the thread is successful (or it is determined that all portions of the data structure have been used with no success, in which case the desired operation fails). Accordingly, this is another example of the bypass locking technique in which a portion of the data structure for which a lock is obtained for a given thread is dynamically determined.

The above scheme of FIG. 7 may be applied, for example, for managing access to queues, such as priority queues for queuing pending events. Consider, for example, an implementation in which a constant k is defined as the number of separate queues, and each thread has a separate integer index j that records its index into the set of separate queues; bypass locking may be employed in such an implementation according to the algorithm shown in FIG. 8.

Figure 8:
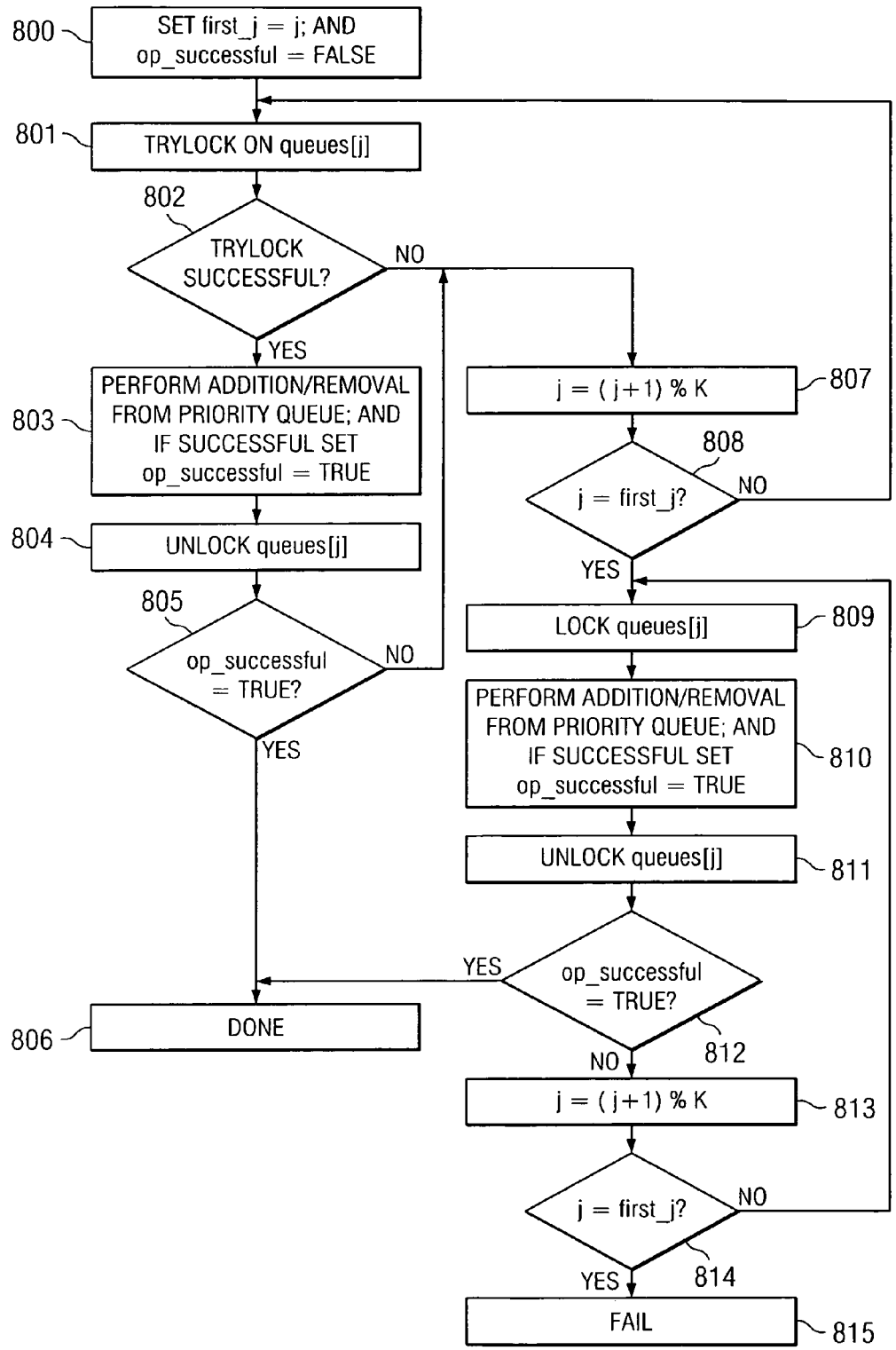
FIG. 8 shows an operational flow diagram for one implementation of the locking scheme of FIG. 7 in greater detail.

In operational block 800 of FIG. 8, variable first_j is set equal to variable j. In this case, "j" is a persistent variable storing the last successful use by this thread. Also, the op_successful variable is initialized to false. In block 801, a trylock is attempted on the queues[j]. That is, trylock is attempted for the jth one of the K queues. In block 802, the algorithm determines whether the trylock was successful. If the trylock is successful for the queues[j], then in operational block 803 one or more additions/removals from the priority queue is/are performed, and if the operation is successful the op_successful variable is set true. In block 804, the thread unlocks the queues[j], and in block 805 the algorithm determines if the op_successful variable is set true. If the op_successful variable is set true, then operation returns in block 806. That is, the procedure is done in block 806 if the op_successful variable is set true.

If the trylock is determined to be unsuccessful in block 802 or if the op_successful variable is determined to be false in block 805, operation advances to block 807 which sets j=(j+1)% K, where K is the number of queues and the "%" operand is a modular arithmatic that in this use is essentially "j:=j+1; if j= =K, then j:=0." The algorithm then determines in block 808 if j equals the first_j. If j does not equal the first_j, operation returns to block 801 and proceeds as described above. If determined in block 808 that j equals the first_j (indicating that the algorithm has stepped through all of the queues and is back to the first_j queue, which was the queue that the thread last successfully accessed), operation advances to block 809.

In this exemplary implementation, if trylock has been attempted on all of the queues with no success in the performance of the desired operation, the algorithm forces trying each of the queues until one is found that the thread can operate on. That is, the thread linearly steps through the queues, starting with the one that it last successfully used, and awaits for the lock to become available for such queue and then determine if it can successfully use such queue. As described above in FIG. 7, in certain implementations rather than stepping through all of the queues, this forcing lock procedure may step through only those queues for which use has not yet been attempted. That is, any queues for which the trylock was successful in block 802 and use was attempted in block 803 may not be attempted again in the forcing lock procedure of the algorithm, in certain embodiments.

In block 809, the thread requests a lock on queues[j], i.e. forces a lock on queues[j]. That is, the thread awaits for the lock to become available for queues[j], and then takes the lock. In block 810 the thread performs addition(s)/removal(s) from the priority queue, and if this operation is successful sets the op_successful variable to true. In block 811, the thread unlocks the queues[j], and in block 812 the algorithm determines if the op_successful variable is set true. If the op_successful variable is set true, then operation returns in block 806. That is, the procedure is done in block 806 if the op_successful variable is set true.

If the op_successful variable is determined to be false in block 812, operation advances to block 813 which sets j=(j+1)% K. The algorithm then determines in block 814 if j equals the first_j. If j does not equal the first_j, operation returns to block 809 and proceeds as described above (i.e., forcing a lock on the new queues[j]). If determined in block 814 that j equals the first_j (indicating that the algorithm has stepped through all of the queues and is back to the first_j queue), the algorithm determines that the operation desired by the thread has failed in block 815. That is, the desired operation (addition(s)/removal(s) from a priority queue in this example) has been attempted in all queues with no success.

The exemplary scheme of FIG. 8 can be represented by the following pseudocode:

```
1.  // try to find a queue to operate on by searching in linear order, starting at the last
    one the requesting thread successfully used
2.  first_j : = j; op_successful := false;
3.  while(true) {
      a.  if (queues[j].trylock( )) {
            i.   if can add/remove from priority queue, set op_successful true;
            ii.  queues[j].unlock( );
            iii. if (op_successful) {
                   1. return;
            iv. }
      b.  }
      c.  j=(j+1) % K;
      d.  if (j = = first_j) break;
4.  }
5.  // force trying each of the queue, until one is found that the thread can operate on.
6.  while(true) {
      a.  queues[j].lock( );
      b.  if can add/remove from priority queue, set op_successful true;
      c.  queues[j].unlock( );
      d.  if (op_successful) return;
      e.  j = (j +1) % K;
      f.  if (j = = first_j) break;
7.  }
8.  return could_not_succeed;
```

There are a number of optimizations/alternatives that may be implemented in the above exemplary implementation. As one example, in the performance of the while loop of step 6, the algorithm may only try to lock the queues that it did not lock in the first while loop of step 3. As another example, the algorithm may move on to the next queue (increment j mod K) when it successfully accesses a queue, this will make the different threads tend to use all of the queues, instead of the above-described algorithm which will tend to separate threads by queue. That is, in the above algorithm threads will stay with one portion until forced off by contention. As another example, instead of working linearly through a list, the algorithm may be implemented such that each thread selects a random shuffle of the indices and uses those as its order, e.g., instead of accessing queues[j], the requesting thread may access queues[myshuffle[j]]. As yet another example, instead of re-starting at the beginning on contention, in certain implementations of the algorithm the j pointer may be moved to a random value. As still another example, if the operation is a removal, in certain implementations of the algorithm an unlocked check may be made to determine if there is data that is removable before bothering to attempt the trylock.

As is well known, convoys normally build up when different threads are forcing access to all of a series of locks in the same order. In the above algorithm, if contention is encountered, the algorithm skips over the lock that is causing contention and moves onto the next one. If threads happen to synchronize by all accessing the data structure repeatedly at the same time, they will tend to spread out across the various queues, thus reducing contention.

An exemplary system 900 in which the above algorithm of FIG. 8 may be applied is shown in FIG. 9. System 900 includes K queues, shown as queues $901_1, 901_2, \ldots, 901_K$. System 900 further includes one or more processors, such as processors $902_1, \ldots, 902_M$, that are each executing one of threads 904. In this example, a thread being executed by processor $902_1$ desires a lock on a queue. Thus, as described above, the thread first attempts $903_1$ to obtain a lock $905_2$ on a queue that it last successfully used (which in this example is queue $901_2$. If the lock is not available for this queue (or the desired addition/removal cannot be successfully performed with this queue), the thread attempts $903_2, 903_3, \ldots, 903_{k-1}$, $903_k$ to obtain locks ($905_3, \ldots 905_k, 905_1$) the other queues in the manner described above with FIG. 8, stopping if one of the queues is available and the desired operation could occur on the available queue.

A second exemplary general embodiment of bypass locking is now described. The exemplary forms of bypass locking described above with FIGS. 3-9 assume that access to any part of the resource (e.g., data structure) is acceptable, which is useful for resources shared among a large collection of threads. There is a reverse condition wherein a smaller number of threads (or CPUs) are processing work associated with a number of non-partitionable data structures. Accordingly, another exemplary form of bypass locking is now described, which is particularly useful for accessing such resources (e.g., data structures) that are not logically divided into separate lockable portions (e.g., that are not partitioned). In this exemplary embodiment, a queue of pending work is added to the resource. In short, if a lock for the desired resource, which may be referred to herein as a "main lock," is available, the requesting thread will take the lock and perform its desired work. If the main lock is not available, a description of the work that the requesting thread desires to perform is placed in a pending queue associated with the resource, and the thread that is currently holding the lock processes such work from the pending queue when it completes its own work. This allows the requesting thread that could not do the work that it desired to perform with the resource to continue its operation performing other tasks. In certain embodiments, there may be multiple non-partitionable resources in a system, and each of the multiple resources may have associated therewith a corresponding pending queue. Thus, locking may be handled for each of the non-partitionable resources in the manner described below.

FIG. 10 shows a flow diagram of an embodiment that uses bypass locking. In operational block 1001, the thread desiring to access the resource uses trylock on the resource. As mentioned above, the trylock locking primitive tries to obtain a lock and then immediately returns a variable indicating if acquisition was successful. If trylock is successful, it acquires the lock. In block 1002, the thread, determines whether the trylock was successful in acquiring a lock on the resource. If it was successful, then the lock is held, and operation advances to block 1003 whereat the thread uses the locked resource to perform its work.

When determined in block 1003 that use of the locked resource for performing the thread's work is complete, the thread checks the pending queue associated with the resource to determine in block 1004 whether any work is pending in the pending queue for this resource. As described further below with block 1007, if a thread attempts to acquire the lock for this resource while another thread is holding the lock for the resource, the requesting thread places a description of the work it desires to perform with this resource in the pending queue associated with the resource. Thus, in block 1004 the thread holding the lock for the resource checks its pending queue to determine whether any work was placed in the pending queue by another thread while the thread holding the lock was using the resource to perform its work. If it is determined that work is pending in the pending queue, the thread holding the lock for the resource performs that work and clears it from the pending queue in block 1005. Operation then loops back to block 1004 where the thread holding the lock again checks the pending queue to see if any further work is pending therein. Once determined in block 1004 that no work is pending in the resource's pending queue, operation advances to block 1006 where the thread unlocks the resource, and the algorithm completes in block 1008.

If determined in block 1002 that the trylock was not successful, operation advances to block 1007 where the requesting thread adds a description of the work that it desires to perform using this resource to the resource's pending queue. The algorithm then completes for this requesting thread in operational block 1008. Accordingly, after placing a description of the work that it desires to perform in the resource's pending queue, the requesting thread is free to move on to performing other tasks. As described above and operational blocks 1004 and 1005, the thread holding the lock for the resource will perform the work placed by the requesting thread in the resource's pending queue.

The above operational flow of FIG. 10 provides one exemplary embodiment of the bypass locking technique in which a portion of the resource (e.g. shared data structure) for which a lock is obtained for a given thread is dynamically determined. For instance, this exemplary technique dynamically determines whether a requesting thread takes a lock on a "main" portion of the resource or on an associated "pending" portion of the resource. As described further below, implementations of this embodiment may be adapted for implementing a locking scheme that is particularly useful for a non-partitionable resource such as per-object state, common (shared) statistics, and accumulation buffers, as examples. This exemplary locking scheme may be desirable for use with many data structures, particularly those for which it is desirable to lock the data structure, do all the desired work, and then unlock the data structure. Partitioning usually works best when processing can be performed unlocked, such as with the exemplary buffer pool implementation described above (in which a lock is obtained for "taking" a buffer pool, but then the taken buffer pool can be used by a thread unlocked). The exemplary locking scheme of FIG. 10 may be desirable for use with resources that are not best partitioned (e.g., those resources for which processing cannot be performed unlocked).

Figure 11:
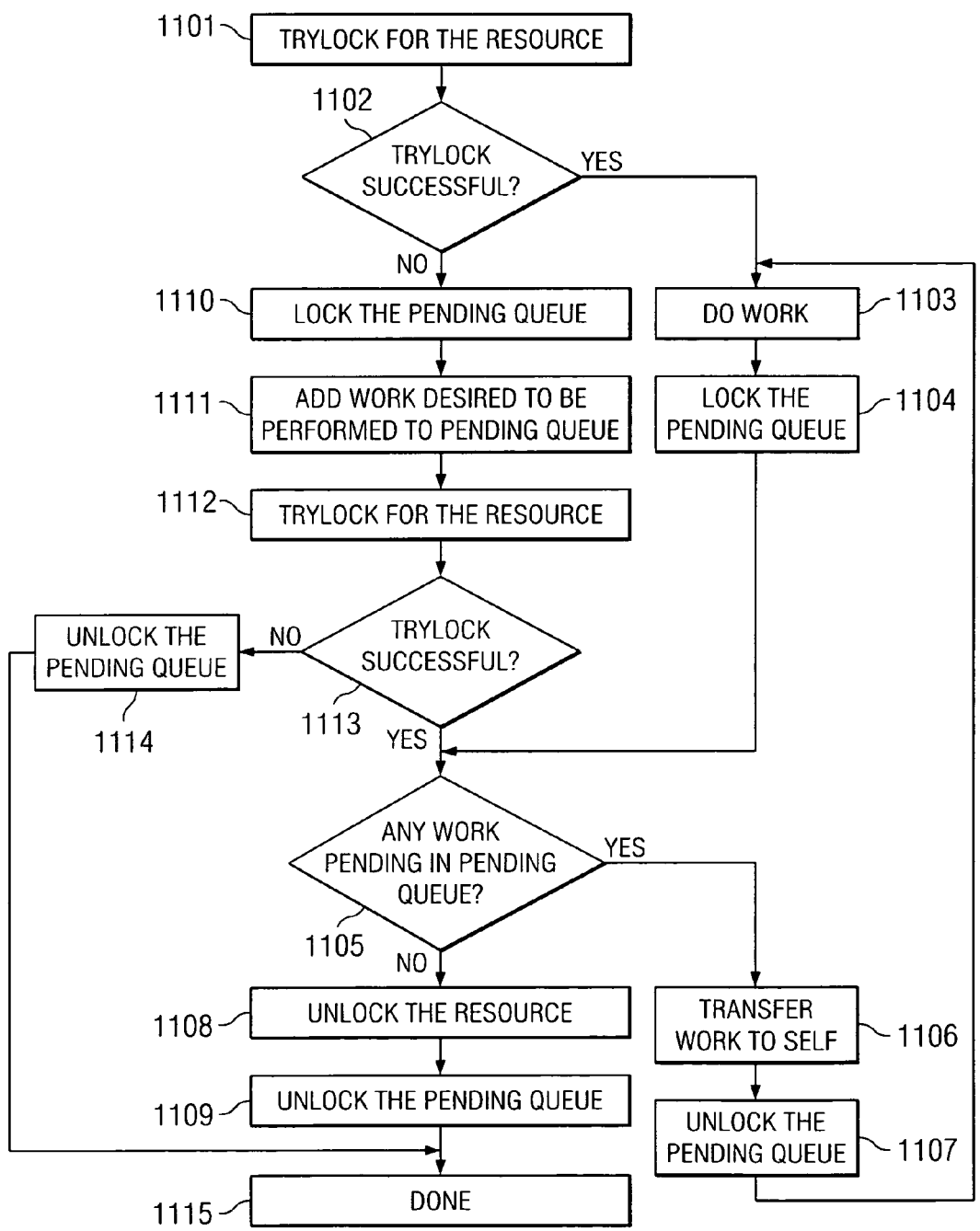
FIG. 11 shows an operational flow diagram for one implementation of the locking scheme of FIG. 10 in greater detail.

One exemplary implementation of the embodiment of FIG. 10 is shown in FIG. 11. In this exemplary implementation, two locks are employed: 1) a "main lock" for the resource (e.g., data structure), and 2) a "pending lock" for the pending queue associated with the resource. In operational block 1101, the thread desiring to access the resource uses trylock on the resource. In block 1102, the thread determines whether the trylock was successful in acquiring a lock (the "main lock") on the resource. If it was successful, then the main lock is held, and operation advances to block 1103 whereat the thread uses the locked resource to perform its work. Then, in block 1104 the thread locks the pending queue associated with the resource (using the "pending lock"), and determines in block 1105 whether any work is pending in the pending queue for this resource.

If determined in block 1105 that work is pending in the pending queue, the thread transfers the work from the pending queue to itself in block 1106 and then unlocks the pending queue in block 1107. Operation then returns to block 1103 where the thread holding the lock performs the work that it transferred to itself from the pending queue. Operation then proceeds again to block 1104 and then to block 1105. Once determined in block 1105 that no work is pending in the pending queue for this resource, the thread unlocks the resource in block 1108 and unlocks the pending queue and block 1109, and the locking algorithm completes for this thread in block 1115.

If determined in block 1102 that the trylock was not successful, operation advances to block 1110 where the requesting thread locks the pending queue associated with the resource (using the "pending lock"), and adds a description of the work that it desires to perform using this resource to the resource's pending queue in block 1111. In block 1112, the requesting thread again attempts trylock for the resource, and in operational block 1113 the requesting thread determines whether the trylock was successful. This ensures that in the event the requesting thread added its work to the pending queue after the thread holding the lock for this resource checked the pending queue and determined that no work is pending (as in block 1105), the work placed in the pending queue will not be overlooked by the threads. Accordingly, if determined in block 1113 that the trylock is successful, the requesting thread holds the lock to the resource (i.e. the "main lock"), as well as the lock to the pending queue (i.e., the "pending lock"), and operation advances to block 1105 where the requesting thread determines if any work is pending in the resource's pending queue. If work is pending in the pending queue, operation advances through blocks 1106, 1107, and 1103 as described above such that the thread now holding the lock performs the pending work.

If determined in block 1113 that the trylock was unsuccessful, operation advances to block 1114 where the requesting thread unlocks the pending queue. The algorithm then ends for this requesting thread in block 1115.

Thus, in this instance, the resource may be considered as having a main portion that is lockable (e.g., the lock for the resource itself) and an associated pending portion that is lockable (e.g., the lock for the associated pending queue). Therefore, the associated pending queue may be considered a "portion" of the corresponding resource. Accordingly, this exemplary algorithm dynamically determines for a thread which portion of the resource that the thread is to lock. That is, the algorithm dynamically determines whether a thread requesting access to the resource is to obtain a main lock (on the resource itself) or a pending lock (on an associated pending queue).

The above procedure may be modified in certain implementations so that instead of using two separate locks (i.e., the main lock and the pending lock), a single lock with a flag is instead used. This adds in some additional unlock stages to release the lock while a particular thread is working on the resource (e.g., data structure). The pending queue is most naturally implemented as a double ended queue, which means that with the standard array implementation of a double ended queue, the addition of work to the pending queue could be reduced to two uncached reads (to get the current end of the queue and the cache line containing those pointers) and one write (to place a pointer to the additional work description into the pending queue). It should be noted that in the above exemplary implementation, the locks are obtained and released in different orders. That is, the locks are not released in the reverse order in which they are obtained. For instance, following the flow through blocks 1101, 1102, 1103, 1104, 1105, 1108, 1109, and 1115, a main lock is first obtained (in block 1102, wherein trylock is successful), then the pending lock is obtained (in block 1104), then the main lock is released (in block 1108), and finally the pending lock is released (in block 1109). However, by appropriate use of trylock, the algorithm will not deadlock.

Turning to FIG. 12, an exemplary system 1200 in which the algorithm of FIG. 11 may be employed is shown. System 1200 includes resource (e.g., data structure) 1201 and an associated pending queue 1202. System 1200 further includes a plurality of threads, such as $Thread_1$ and $Thread_2$ illustrated in FIG. 12. In the illustrated example of FIG. 12, $Thread_1$ holds lock 1203 on resource 1201. $Thread_2$ attempts trylock 1204 on resource 1201, which fails 1205. Thus, as described above, $Thread_2$ places a description 1206 of the work it desires to perform using resource 1201 in pending queue 1202, and $Thread_1$ will assume this work as its own and perform it before releasing lock 1203.

It should be noted that the above scheme of FIGS. 10 and 11 dynamically determines which thread is to perform a desired operation. That is, for a given resource, the algorithm dynamically determines whether a thread requesting access to the resource is to perform the work (i.e., use the resource), or whether another thread (i.e., a thread holding the lock to the resource at the time of the request) is to perform the work. Accordingly, rather than a thread requesting access to a resource being statically assigned for performing the desired work, the requesting thread may, upon detecting that a lock on the resource is not available (i.e., is held by another thread), dynamically transfer the desired work to a pending queue associated with the resource, wherein another thread (i.e., the thread holding the lock for the resource) performs the desired work.

As mentioned above, "work stealing" techniques are known in the art in which if a particular processor/thread is idle, such idle processor/thread attempts to find another thread with available work and steal some fraction of that work for itself, such as described in "Scheduling Multi-threaded Computations by Work Stealing" by Robert D. Blumofe and Charles E. Leiserson, 35*th Annual Symposium on Foundations of Computer Science (FOCS '94)*, Nov. 20-22, 1994, Santa Fe, N. Mex., pp. 356-368, the disclosure of which is hereby incorporated herein by reference. Accordingly, in a sense this "work stealing" technique dynamically determines a thread that is to perform some available work in that the work desired to be performed by one thread may be stolen and performed by another thread. It should be recognized, however, that the above exemplary scheme of FIGS. 10 and 11 provide a different technique for dynamically determining a thread to perform some desired work than that of work stealing.

First, in the above exemplary embodiment of FIGS. 10 and 11, the dynamic determination of which thread is to perform the work that a given thread desires to have performed is made for each lock request made by a thread, rather than such determination being made just when a given thread is idle and desires to steal work. The work may be re-assigned to another thread, even though the other thread is not idle. That is, in work stealing the work is only stolen from one thread by a second thread if the second thread is idle, whereas in the exemplary embodiment of bypass locking of FIGS. 10 and 11 the work of one thread may be placed in a pending queue to be performed by a busy thread (that currently holds the lock to the resource). Also, the thread desiring for the work to be performed takes the action for placing the work in the pending queue for re-assignment to another thread, rather than awaiting for an idle thread to steal the work.

Additionally, the exemplary embodiment of bypass locking of FIGS. 10 and 11 enables dynamic determination of a thread to perform some desired work using a desired portion of a resource. That is, this exemplary embodiment enables the work to be performed using a given portion of a resource, but the thread that performs the work using such given portion of the resource may be dynamically determined. In work stealing, a resource is divided into different partitions with threads each being statically assigned to a specific portion, and if a thread is blocked from using its pre-assigned portion of the resource for performing its work while another thread is free for using its pre-assigned portion of the resource, the free thread may steal the work from the blocked thread and use the portion of the resource pre-assigned to such free thread for performing the work of the blocked thread. Thus, a different portion of the resource is used by the stealing thread than is requested by the thread desiring to have the work performed. In the exemplary embodiment of bypass locking of FIGS. 10 and 11, a portion of the resource that is requested by a thread is ultimately used for performing the work, but such work may be performed by a different thread using the requested portion of the resource.

Additionally, in work stealing, the number of threads implemented is typically kept small since to steal work an idle thread may have to check all the other threads to determine one from which it can steal work. The above exemplary algorithm of FIGS. 10 and 11 enables dynamic determination of a thread that is to perform some desired work irrespective of how many threads are implemented, and efficiency is maintained because work is simply transferred if another thread already possesses a lock for using the desired resource.

While an exemplary embodiment of bypass locking in which the thread to perform some desired work is dynamically determined is described with FIGS. 10 and 11 above, the concept for dynamically determining a thread to perform work in this manner is not limited to that exemplary algorithm. For instance, the exemplary algorithm of FIG. 8 could be used for a queue that has been divided into portions. If threads place work descriptions into such a "queue" and also remove descriptions so that they can perform the described work, then the system of threads dynamically determines which thread will perform each piece of work. It should be noted that no lock is held by the exemplary algorithm of FIG. 8 while the work is processed, in contrast to the algorithm of FIG. 11 which holds the resource lock while processing the work.

In view of the above, various exemplary locking schemes for employing bypass locking in which a portion of a resource to be locked by a requesting thread is dynamically determined (e.g., determined upon the access request by the thread). Further, the above examples illustrate that such bypass locking can be employed using standard locking primitives, such as trylock, lock, and unlock, while minimizing blocking.

Further, as described above, certain exemplary locking schemes for employing bypass locking are provided in which a thread to perform desired work is dynamically determined. That is, for a given resource, certain algorithms dynamically determine whether a thread requesting access to the resource is to perform the work (i.e., use the resource), or whether another thread (e.g., a thread holding the lock to the resource at the time of the request) is to perform the work. Further, the above examples illustrate that such bypass locking schemes that dynamically determine the thread to perform desired work can be employed using standard locking primitives, such as trylock, lock, and unlock, while minimizing blocking.

What is claimed is:

1. A method comprising:
a first thread desiring to perform work using a resource, wherein the first thread executes on a processor;
the first thread determining whether another thread holds a lock on the resource;
if the first thread determines that another blocking thread is holding a lock on the resource, said first thread locking a pending queue associated with the resource, and after locking the pending queue, said first thread placing a description of the work in the pending queue;
the blocking thread performing the work described in the pending queue using the resource; and
after placing the description of the work in said pending queue, the first thread performing other work without waiting for said work described in the pending queue to be performed.

2. The method of claim 1 further comprising:
the blocking thread using the resource to perform some first work, while the blocking thread holds said lock on the resource; and
the blocking thread then determining whether any work is pending in the pending queue associated with the resource before unlocking the resource.

3. A method comprising:
a first thread desiring to perform work using a resource, wherein the first thread executes on a processor;
the first thread determining whether another thread holds a lock on the resource;
if the first thread determines that another blocking thread is holding a lock on the resource, said first thread locking a pending queue associated with the resource, and after locking the pending queue, said first thread placing a description of the work in the pending queue;
the blocking thread performing the work described in the pending queue using the resource; and
the blocking thread assigning to itself the work described in the pending queue for performance thereof using the resource while the blocking thread holds the lock on the resource.

4. A method comprising:
attempting, by a first thread executing on a processor and that desires to use a resource for performing work, trylock on the resource;

if said trylock is unsuccessful, the first thread locking a pending queue associated with the resource, and after locking the pending queue, the first thread placing a description of the work in the pending queue;

a second thread that holds a lock on the resource performing the work described in the pending queue; and after placing the description of the work ("pending work") in said pending queue, the first thread that placed the description in the pending queue performing other work without waiting for said pending work to be performed.

5. The method of claim 4 further comprising:

if said trylock is successful, said first thread holding a lock on the resource and performing the work.

6. A method comprising:

attempting, by a first thread executing on a processor and that desires to use a resource for performing work, trylock on the resource;

if said trylock is successful, said first thread obtaining a lock on the resource and performing the work;

if said trylock is unsuccessful, said thread placing a description of the work in a pending queue associated with the resource;

the first thread obtaining a lock on the pending queue before the first thread places the description of the work in the pending queue;

after placing the description of the work in the pending queue, said first thread attempting a second trylock on the resource to perform the work;

if said second trylock is successful, said first thread obtaining a lock on the resource and performing the work using the resource;

after a second thread holding a lock on the resource performs work using the resource, the second thread holding the lock on the resource performing any work identified in the pending queue before unlocking the resource; and the second thread assigning to itself any work identified in the pending queue for performance thereof using the resource while the second thread holds the lock on the resource.

7. The method of claim 6 further comprising:

after placing the description of the work in said pending queue, the first thread is available to perform other work.

8. The method of claim 6 further comprising:

after placing the description of the work ("pending work") in said pending queue, the first thread performing other work without waiting for said pending work to be performed.

9. A system comprising:

at least one processor for executing a plurality of threads;

a lockable resource usable by said plurality of threads;

said threads each configured to dynamically determine a thread to use the lockable resource for performing work, wherein a first of the threads desiring to perform work using the lockable resource is configured to determine whether a lock is available for the resource;

wherein if said lock is determined available for the lockable resource, the first thread is configured to hold the lock on the lockable resource and use the lockable resource to perform the work; and wherein if said lock is determined not available for the lockable resource, the first thread is configured to place a lock on a pending queue associated with the lockable resource and after placing the lock on the pending queue, place a description of the work in the pending queue, wherein if said lock is determined not available for the lockable resource, then after placing the description of the work ("pending work") in said pending queue, the first thread is configured to perform other work without awaiting for said pending work to be performed.

10. The system of claim 9 wherein after a second of the threads that holds a lock on the resource performs work using the resource, the second thread that holds the lock is configured to performs any work described in the pending queue before unlocking the resource.

11. The system of claim 9 wherein if said lock is not available to the first thread for the lockable resource because the lock is held by a second of the threads, the second thread is configured to perform the work described in the pending queue.

12. A multi-threaded system comprising:

at least one processor;

a lockable resource that is usable by a plurality of threads executable on the at least one processor;

a pending queue associated with the lockable resource;

wherein a first of the threads that desires to perform work using the lockable resource is configured to:

attempt a trylock on the lockable resource, if the trylock is unsuccessful, place a description of the work in the pending queue, wherein the first thread is configured to obtain a lock on the pending queue before the first thread places the description of the work in the pending queue;

after placing the description of the work in the pending queue, attempt a second trylock on the resource to perform the work, wherein if the second trylock is also unsuccessful, a second of the threads that holds a lock on the lockable resource is configured to perform the work described in the pending queue, wherein the second thread is configured to assign itself the work described in the pending queue for performance thereof using the lockable resource while the second thread holds the lock on the lockable resource.

* * * * *

UNITED STATES PATENT AND TRADEMARK OFFICE
CERTIFICATE OF CORRECTION

| | | |
|---|---|---|
| PATENT NO. | : 7,797,704 B2 | Page 1 of 1 |
| APPLICATION NO. | : 11/094554 | |
| DATED | : September 14, 2010 | |
| INVENTOR(S) | : Eric A. Anderson | |

It is certified that error appears in the above-identified patent and that said Letters Patent is hereby corrected as shown below:

In column 24, line 21, in Claim 10, delete "performs" and insert -- perform --, therefor.

Signed and Sealed this
Twenty-second Day of March, 2011

David J. Kappos
*Director of the United States Patent and Trademark Office*